Sept. 25, 1962 J. A. AILEO 3,055,013
HELMET CONSTRUCTION
Filed July 23, 1959
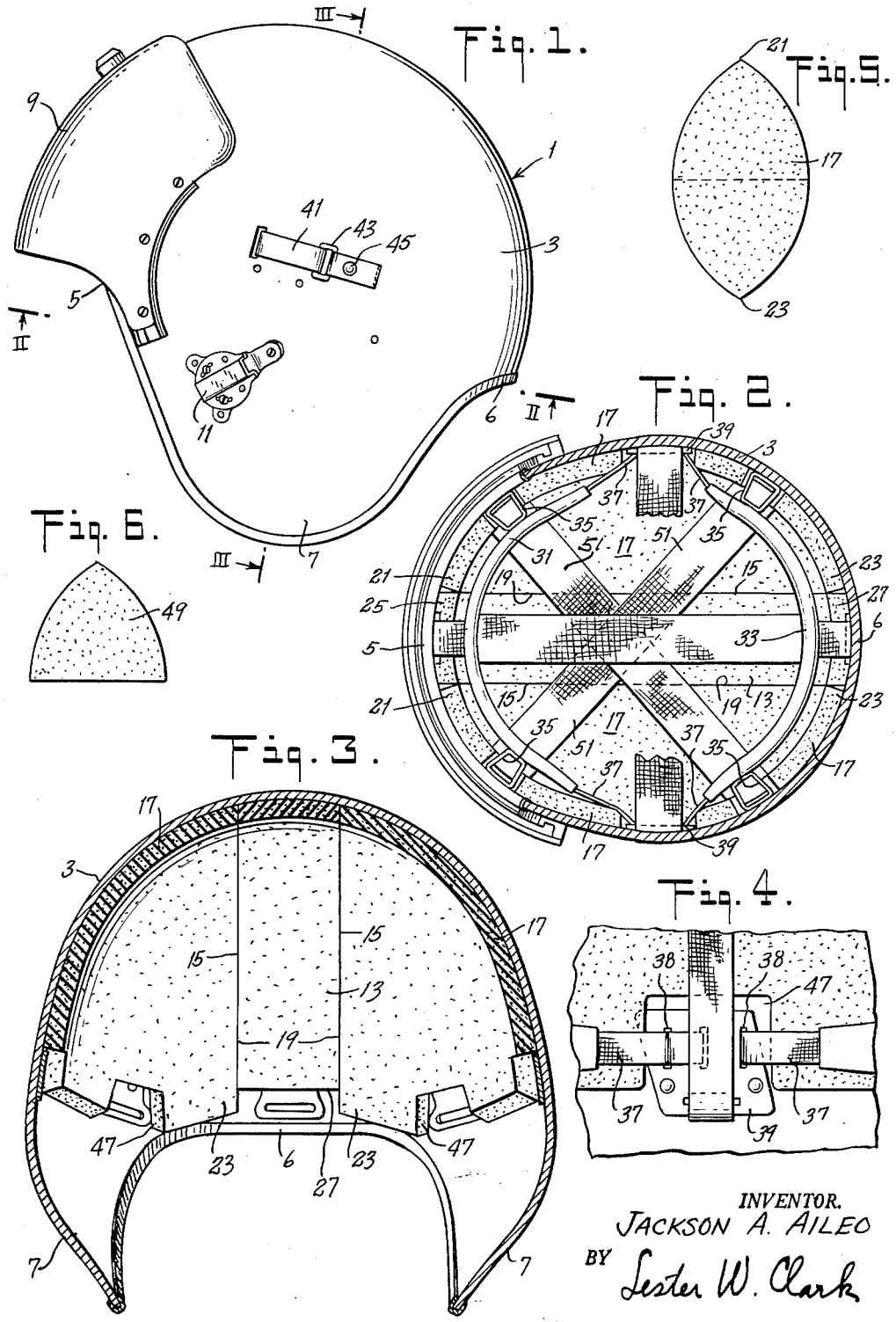
INVENTOR.
JACKSON A. AILEO
BY Lester W. Clark
ATTORNEY

3,055,013
HELMET CONSTRUCTION
Jackson A. Aileo, Carbondale, Pa., assignor to Leonard P. Frieder, Great Neck, N.Y.
Filed July 23, 1959, Ser. No. 829,133
3 Claims. (Cl. 2—3)

This invention relates to a protective helmet and more especially to such a helmet provided with a lining which is capable of absorbing energy, such as shock, vibrations and noise. The invention particularly relates to a novel construction for retaining such a lining in the helmet.

Linings of various kinds have been utilized in protective helmets, for example, helmets that are used by aviators and in industry and for other purposes, where protection of the head against shock, for warmth, or to reduce vibration, sound transmission, etc. are required. Various means have been utilized for fastening such linings within the helmet, including mechanical fasteners, rivets and the like. It also has been proposed to utilize as a lining for the interior surface of the helmet a resilient material glued to the internal surface of the helmet for absorbing the energy of shock or vibrations and the like. Such fastening means are disadvantageous in the respect that they may require many openings through the shell of the helmet and a large number of fasteners. In the use of adhesives for securing the lining or pads to the interior of the helmet, especially when utilizing pads of plastic material having an open structure which is absorbent, deterioration of the pad occurs by reaction of the adhesive material therewith. The pad may crumble and may shrink, causing it to pull away from the shell.

It is an object of the invention to provide a lining construction which avoids the use of mechanical fasteners and of adhesives.

It is a further object of the invention to provide a lining construction which is self supporting within the helmet and which develops the requisite forces acting outwardly to hold the lining in place with respect to the inner surface of the helmet.

It is an additional object of the invention to provide a lining construction which readily may be inserted within the helmet in engagement with the inner surface of the helmet and in such form as to develop the requisite lining retaining forces.

It is a feature of the invention that the lining utilized is made of a resilient material which for limiting energy transmission and for heat insulation may be of a fine porous structure and is compressible, as well as being pliable so that it may be resiliently formed to a curved contour to conform to the inner surface of the shell of the helmet. The form of the lining is such as to provide a face for juxtaposition with respect to the inner surface of the shell and a configuration in the extent of the lining along this face in the unstressed condition of the material which is flatter than the curvature of the inner surface of the shell of the helmet. Preferably this linking material is made into flat pads of more or less uniform thickness and providing generally parallel planar surfaces in the unstressed condition of the material. These pads may be formed with a peripheral outline and may be bent to a curved configuration such that the pad will conform to the inner surface of the shell of the helmet without buckling. The inner surface in a conventional helmet may be generally hemispherical or may be generally that of a portion or segment of a sphere. The invention is not limited in its application to helmets which are of this generally spherical type but may find use in helmets which have concave inner surfaces of substantial extent and curvatures which will produce the reactions with the resilient lining material in juxtaposition thereto developing the forces referred to which effectively hold the lining material within the helmet.

In order to develop the outwardly directed holding forces to securely hold the lining pads within the helmet without the use of adhesives or other fastening means, these pads are cut in the flat form to peripheral outlines which will provide for abutting two pads along adjacently disposed edges thereof with outer edges of the pads disposed toward the edges of the helmet. In the preferred embodiment these outer edges may be disposed in spaced relation to the abutted edges along a considerable part of the extent of these outer edges. In this preferred embodiment these outer edges extend generally in a plane which is transverse to the vertical when the helmet is in place on the head and may be disposed adjacent a head band means suitably connected to the helmet for supporting the helmet on the head with the inner surface thereof in spaced relation to the head.

The pads of resilient lining material are cut to such dimensions that when placed within the helmet with the adjacent edges abutting as above described and with the pads bent to a curvature conforming to that of the inner surface of the shell, compression of these pads parallel to the face thereof or along the curvature in the position thereof within the helmet is effected, so that the resilient reaction of this compression and of the bending maintains the abutted edges in mutually pressing relation and develops the forces in the pads along the curvature thereof, so that components of these forces that act outwardly to press the pads upon the inner surface of the shell are developed.

To meet practical conditions and to provide a form of the pads which will develop the required forces, at least two pads may be used but preferably a centrally disposed pad extending over the crown portion of the helmet is provided and two pads are disposed respectively at the sides thereof in the required abutting relation and in the curved configuration which develops the retaining forces referred to.

Ordinarily, no fastening means and no adhesive is required to hold the pads in place. In some cases, however, especially where the portion of the inner surface of the shell is generally in the form of a segment of a sphere less than a hemisphere, it may be necessary to provide means supported by the shell and engaging the edge portions of the pads that are disposed toward the edges of the shell to hold these edge portions against slipping movement over the inner surface of the shell. When means for holding such edge portions is used it is only necessary to provide two or three such holding means suitably distributed along the edge portions of the side pads, the curved configuration of the pads in their abutting relation insuring that the main portions of the pads are securely held in position without such holding or fastening means. In helmet constructions which utilize a head band means for supporting the helmet with its inner surface in spaced relation to the head of the wearer, the supporting means or elements carried by the shell of the helmet and connected to the head band means may serve for the desired engagement with the outer edge portions of the pads to hold these edge portions in the manner referred to.

Other objects of the invention and features thereof will be understood from the description to follow of the drawings in which:

FIG. 1 is a side elevation of a helmet in which the invention is embodied;

FIG. 2 is a generally horizontal section on line II—II of FIG. 1;

FIG. 3 is a general vertical section on line III—III of FIG. 1;

FIG. 4 is a face view of the inner surface of the helmet showing means engaging an edge portion of a pad;

FIG. 5 shows the outline of one form of a pad;

FIG. 6 shows the outline of a modified form of a pad.

In the drawing the helmet 1 provides a rigid hollow shell 3 the inner surface of which is of concave curvature substantially throughout the extent thereof between edge portions of the shell extending about an opening for passage of the head of the wearer therethrough. This shell and its inner surface are of generally hemispherical form in the embodiment disclosed and the front edge 5 of the opening and the back edge 6 thereof are disposed oppositely generally on a diameter transverse to the vertical dimension through the helmet. Conventionally the helmet provides ear covering portions 7 extending downwardly from the hemispherical body. The helmet may be provided with a visor movable to a retracted position beneath a cover 9 fixed to the shell and with a latching device 11 for attaching a gas mask to the helmet.

Within the shell 3 in the embodiment disclosed is disposed a central pad 13 which extends over the crown portion of the helmet from the forward edge portion 5 thereof to the portion adjacent the rear edge 6 thereof. This pad is formed of resilient material which may be a plastic. In order to provide good energy absorbing properties and especially for deadening the sound of engines or other noises and vibrations which the wearer may experience, these pads may be of an expanded vinyl plastic which provides the requisite resilience as well as the porous structure which affords the sound deadening properties. The central pad 13 may be cut in a generally elongated rectangular form from a flat sheet of substantial thickness as shown in the drawings. The width of the rectangular pad 13 is such that, when it is bent into an arc so as to extend over the crown of the shell, it will also bend laterally without buckling so as to conform well to the curve of the shell at the crown as well as at other portions of the central part of the shell between the forward edge 5 and the rear edge 6. These curvatures of the pad 13 are shown in FIGS. 2 and 3 of the drawings.

The pad 13 provides longitudinal edges 15 in abutment with which side pads 17 are disposed at either side of the pad 13 with longitudinal edges 19 of the pads 17 respectively abutting and compressively pressing against the edges 15 of the pad 13. The pressure of the pads 17 against the pad 13 is produced concomitantly with bending the pads 17 to the curved configurations and placing the pads within the shell 3 with a face of each pad 17 conforming to the inner surface of the shell 3. It will be understood, in order that the edges 19 of the pads 17 shall be capable of abutting the rectilinear edges 15 of the pad 13, and having regard to the curvature of the pads 17, that in the flat form of the material the edges 19 are required to be cut on a curve. In the embodiment shown the outline of the pads 17 in this flat form is generally that of a lune, or of an orange peel, as in FIG. 5, opposite sides of this pad being provided by two smooth curves extending between and intersecting at two oppositely disposed apices 21, 23. The dimension of the pads between these apices and the width of the pads at their widest point between the curves are such that when the pad is bent to the curved configuration the apex portions respectively will be disposed adjacent the forward end 25 and the rearward end 27 of the pad 13. When the pads 17 in this form are thus placed within the helmet in the configuration of the inner surface thereof, by virtue of the abutment of the pads the forces acting along the curvature of the pads develop components perpendicular to the face thereof which act outwardly of the wall of the shell 3 to hold the pads against the inner surface of the shell.

With a helmet of the generally hemispherical form illustrated in the drawings ordinarily no additional securing means will be required to hold pads in position in the helmet, since the pads extend to outer edges that are adjacent a diametral plane of the sphere. In some cases, however, it may be desirable to utilize an auxiliary means for holding the edge portions of the pads 17. Such a means is shown in FIGS. 2 and 4 and now will be described.

In the helmet shown in the drawings head band means is utilized having a forward head band 31 and a rear head band 33 for engaging the head of the wearer of the helmet and holding the shell in spaced relation to the head. These head bands are connected by elastic connections 35 to the shell 3 and provide for a certain degree of movement of the head bands 31, 33 in relation to each other to accommodate the head bands to the head of the wearer. These head bands also are connected by straps 37 that are threaded through apertures 38 in side plates 39 which are secured to the shell 3 at either side of the helmet. These straps thus threaded also provide adjustment and accommodation to the head of the wearer, the ends 41 of the straps being brought out through the side of the helmet so as to be accessible and being adjustably secured to the helmet by means of the buckle 43 and snap button 45.

It will be noted in FIGS. 2 and 4 that the straps 37 bear somewhat on edge portions of the pads 17 provided by a notch 47 cut on the outer edge portion of the pad 17. The elastic connections 35 also may be disposed so as to have bearing on notched edge portions of the pads 17, the connections 35 and the straps 37 serving to resist movement of these edge portions over the inner surface of the shell and thus, where it is necessary, aiding in the action of holding the pads in place secured by virtue of the forces developed therein due to the curved configuration. While to avoid additional illustration these auxiliary means for holding the edge portions of the pads is shown in connection with a helmet of generally hemispherical form, it ordinarily will not be necessary to use such auxiliary means with such a helmet. Where, however, the plane which includes the forward and rear edge portions 5 and 6 of the helmet is disposed nearer the crown of the helmet than as shown in the drawings and, therefore, the curved extent of the pads is reduced, such auxiliary means may be used for holding the edge portions of the pads to aid in developing the reactions therebetween along the abutting edges and the outward pressure on the inside surface of the helmet.

It will be understood further that the pad 17, instead of being of orange peel form as shown in FIG. 5, may be cut in two generally along a vertical line in FIG. 2 of the drawings. Each part of the pad thus divided then will have the general form of a sector 49 as shown in FIG. 6. It will be clear that the outline of the edges of this pad 49 will be the same as the two parts of the pad 17 shown in FIG. 5 that are at either side of the dotted line extending across the wide portion of this pad 17. In view of the compressive forces developed along the curved configuration, as above described, two such divided portions 49 when brought together along the line of division in abutting relation in the helmet will compressively engage each other and the outwardly directed components of forces retaining the pads in place will be developed in these two sectors 49.

Within the scope of the invention the pad 17 may be divided into a greater number of parts than the two corresponding to the pad 49 of FIG. 6. Such subdivision may be advantageous in certain helmet constructions for easy insertion of the pads in the space between the shell and the supporting head band and crown strap structure. Such crown straps of conventional form connected to the shell are shown at 51 in FIG. 2.

Different curved configurations of the helmet and different means for supporting the helmet on the head of the wearer may be used. Preferably, in view of the desired thickness of the pads, the means for supporting the shell in spaced relation to be head of the wearer provides the requisite space for the pads. Various types of materials may be used for the resilient pads which are suitable for forming the pads in the curved configuration while providing also the energy absorbing or sound deadening function of the padding or lining. Such variations are intended to be within the scope of the invention as defined in the appended claims.

I claim:

1. In a protective helmet providing a rigid hollow shell having an inner surface which has a concave curvature substantially throughout the extent thereof between edge portions of the shell extending about an opening for passage of the head of the wearer therethrough, the inner dimensions of said shell being large enough to provide for receiving the head of the wearer within said shell with substantial clearance between the head and said inner surface of said shell, and means adapted to engage the wearer's head and connected to said shell for supporting said shell on the head with said clearance, the combination with said shell of three separate pads of resilient material each having a face which in the unstressed condition of said material is flatter than the concave curvature of said inner surface of said shell, said pads being disposed adjacent each other within said shell with said faces thereof in curved conforming relation to said curved inner surface of said shell and covering a substantial area of the head receiving portion of the shell, one of said pads being of elongated shape in its unstressed condition and being disposed centrally of said inner shell surface and with its lengthwise dimension extending over the crown portion of said inner surface of said shell from an end of said central pad adjacent an edge portion of said shell to an end thereof adjacent the oppositely disposed edge portion of said shell, the other pads being disposed at the respective lengthwise sides of said central pad, the mutually adjacent portions of said central pad and of the two adjacent side pads respectively providing edge surfaces transverse to the faces of the respective pads and disposed in mutually abutting relation to each other, said edge surfaces extending continuously between oppositely disposed points adjacent said opposite edge portions of said shell, the peripheral outline of at least a given one of said pads along the extent of said abutting edge surfaces between said points being defined by a continuous curve convex with respect to said pad when said pad is in said flatter unstressed condition of said material, said pads being held in said conforming relation to said inner surface of said shell over the extent of said faces thereof by the outwardly directed force developed by the resilience of said material transmitted mutually between said adjacent pads through said abutting transverse surfaces thereof.

2. In a protective helmet the combination as defined in claim 1 in which said central pad is of elongated rectangular outline in its unstressed condition, said side pads each having in its unstressed condition a convex curved outline along the edge thereof disposed in abutment with the adjacent lengthwise edge of said central pad.

3. In a protective helmet the combination as defined in claim 1 which comprises means supported by said shell and engaging edge portions of said pads that are adjacent the edges of said shell and cooperating with said pads in curved configuration to retain said edge portions of said pads against movement with respect to said inside surface of said shell.

References Cited in the file of this patent

UNITED STATES PATENTS

| 2,634,415 | Turner et al. | Apr. 14, 1953 |
| 2,798,221 | Bailey et al. | July 9, 1957 |
| 2,805,419 | Finken | Sept. 10, 1957 |
| 2,923,941 | Roth et al. | Feb. 9, 1960 |

FOREIGN PATENTS

| 787,583 | Great Britain | Dec. 11, 1957 |